(12) United States Patent
Sarikaya et al.

(10) Patent No.: US 8,676,999 B2
(45) Date of Patent: Mar. 18, 2014

(54) SYSTEM AND METHOD FOR REMOTE AUTHENTICATION DIAL IN USER SERVICE (RADIUS) PREFIX AUTHORIZATION APPLICATION

(75) Inventors: Behcet Sarikaya, Wylie, TX (US); Yangsong Xia, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 1075 days.

(21) Appl. No.: 12/576,056

(22) Filed: Oct. 8, 2009

(65) Prior Publication Data

US 2010/0095011 A1 Apr. 15, 2010

Related U.S. Application Data

(60) Provisional application No. 61/104,542, filed on Oct. 10, 2008.

(51) Int. Cl.
*G06F 15/16* (2006.01)
(52) U.S. Cl.
USPC .......................................... 709/229; 709/227
(58) Field of Classification Search
None
See application file for complete search history.

(56) References Cited

U.S. PATENT DOCUMENTS

| | | | | |
|---|---|---|---|---|
| 2003/0182445 | A1* | 9/2003 | Smith et al. | 709/238 |
| 2007/0220596 | A1* | 9/2007 | Keeler et al. | 726/7 |
| 2007/0274266 | A1* | 11/2007 | Oyama et al. | 370/335 |
| 2008/0107067 | A1* | 5/2008 | Baek et al. | 370/328 |
| 2008/0287094 | A1* | 11/2008 | Keeler et al. | 455/406 |
| 2008/0295154 | A1* | 11/2008 | Suh et al. | 726/4 |
| 2009/0016364 | A1* | 1/2009 | Krishnan | 370/401 |

FOREIGN PATENT DOCUMENTS

| | | |
|---|---|---|
| CN | 1744597 A | 3/2006 |
| WO | 2007137518 A1 | 12/2007 |

OTHER PUBLICATIONS

Sarikaya, et al., "RADIUS Prefix Authorization Application," Network Working Group Internet Draft, draft-sarikaya-radext-prefix-authorization-00.txt, Oct. 1, 2008.
Lourdelet, et. al., "RADIUS Attributes for IPv6 Access Networks," Network Working Group Internet Draft, draft-lourdelet-radext-ipv6-access-01.txt, Jun. 26, 2009.
Bradner, S., "Key Words for Use in RFCs to Indicate Requirement Levels," BCP 14, RFC 2119, Mar. 1997.
Rigney, et al., "Remote Authentication Dial in User Service (RADIUS)," RFC 2865, Jun. 2000.
Aboba, et al., "RADIUS (Remote Authentication Dial in User Service) Support for Extensible Authentication Protocol (EAP)," RFC 3579, Sep. 2003.

(Continued)

*Primary Examiner* — Umar Cheema
(74) *Attorney, Agent, or Firm* — Conley Rose, P.C.; Grant Rodolph; Brandt D. Howell

(57) ABSTRACT

An apparatus comprising a client node configured to communicate with a server node and a plurality of mobile nodes, wherein the client node is configured to obtain Prefix Authorization (PA) for the mobile node from the server node using a Remote Authentication Dial In User Service (RADIUS) protocol. Also disclosed is a network component comprising at least one processor configured to implement a method comprising sending an Access-Request message to an Authentication, Authorization, and Accounting (AAA) PA server using a RADIUS protocol, receiving an Access-Accept message from the AAA PA server using the RADIUS protocol if the Access-Request message is accepted by the AAA PA server, and receiving an Access-Reject message from the AAA PA server using the RADIUS protocol if the Access-Request message is not accepted by the AAA PA server.

17 Claims, 14 Drawing Sheets

(56) References Cited

OTHER PUBLICATIONS

Eronen, et al., "Diameter Extensible Authentication Protocol (EAP) Application," RFC 4072, Aug. 2005.
Troan, et al., "IPv6 Prefix Options for Dynamic Host Configuration Protocol (DHCP) version 6," RFC 3633, Dec. 2003.
Chiba et al., "Dynamic Authorization Extensions to Remote Authentication Dial in User Service (RADIUS)," RFC 5176, Jan. 2008.
Lior, et al., "RADIUS Mobile IPv6 Support," draft-ietf-mip6-radius-05, Jul. 2008.
Li, et al., "Extended Remote Authentication Dial in User Service (RADIUS) Attributes," draft-ieft-radext-extended-attributes-04, Jul. 2008.
Institute of Electrical and Electronics Engineer, "Amendment for Physical and Medium Access Control Layers for Combined Fixed and Mobile Operation in Licensed Bands," IEEE 802.16e, Feb. 2006.
Patil, B., et al., "Transmission of IPv6 Via the IPv6 Convergence Sublayer Over IEEE 802.16 Networks," RFC 5121, Feb. 2008.
Madanapalli, S., "Analysis of IPv6 Link Models for 802.16 Based Networks," RFC 4968, Aug. 2007.
Wasserman, M., "Recommendations for IPv6 in Third Generation Partnership Project (3GPP) Standards," RFC 3314, Sep. 2002.
Salowey et al., "RADIUS Delegated-IPv6-Prefix Attribute," RFC 4818, Apr. 2007.
Droms, R. et al., "DHCPv6 Prefix Delegation for NEMO," draft-ieft-nemo-dhcpv6-pd-03, Dec. 2007.
Weber, G., et al., "RADIUS Design Guidelines," draft-ietf-radext-design-05, Aug. 2008.
Gundavelli, S., et al., "Proxy Mobile IPv6," RFC 5213, Aug. 2008.
Thomson, S., et al., "IPv6 Stateless Address Autoconfiguration," RFC 4862, Sep. 2007.
Zorn, G., et al., "RADIUS Attributes for Tunnel Protocol Support," RFC 2868, Jun. 2000.
Aboba, B., et al., "RADIUS and IPv6," RFC 3162, Aug. 2001.
Draves, R., et al., "Default Router Preferences and More-Specific Routes," RFC 4191, Nov. 2005.
Jeong, J., Ed., et al., "IPv6 Router Advertisement Option for DNS Configuration," RFC 5006, Sep. 2007.
Narten, T., et al., "Guidelines for Writing an IANA Considerations Section in RFCs," RFC 5226, May 2008.
Foreign Communication From A Counterpart Application, PCT Application No. PCT/CN2009/074384, International Search Report dated Jan. 14, 2010, 4 pages.
Foreign Communication From A Counterpart Application, PCT Application No. PCT/CN2009/074384, Written Opinion dated Jan. 4, 2010, 8 pages.
Sarikaya, B., et al., "RADIUS Support for Prefix Authorization," Network Working Group, Internet Draft, draft-sarikaya-radext-prefix-authorization-03.txt, Mar. 9, 2009, 17 pages.
Droms, R., Ed., et al., "Dynamic Host Configuration Protocol for IPv6 (DHCPv6)," Network Working Group, RFC 3315, Jul. 2003, 95 pages.
Deering, S., et al., "Internet Protocol, Version 6 (IPv6) Specification," Network Working Group, RFC 2460, Dec. 1998, 40 pages.
Haskin, D., et al., "IP Version 6 over PPP," Network Working Group, RFC 2472, Dec. 1998, 15 pages.
Carpenter, B., et al., "Transmission of IPv6 over IPv4 Domains without Explicit Tunnels," Network Working Group, RFC 2529, Mar. 1999, 10 pages.
Rigney, C., "RADIUS Accounting," Network Working Group, RFC 2866, Jun. 2000, 29 pages.
Zorn, G., et al., "RADIUS Accounting Modifications for Tunnel Protocol Support," Network Working Group, RFC 2867, Jun. 2000, 12 pages.
Rigney, C., et al., "RADIUS Extensions," Network Working Group, RFC 2869, Jun. 2000, 44 pages.
Carpenter, B., et al., "Connection of the IPv6 Domains via IPv4 Clouds," Network Working Group, RFC 3056, Feb. 2001, 22 pages.
Droms, R., Ed., "DNS Configuration Options for Dynamic Host Configuration Protocol for IPv6 (DHCPv6)," Network Working Group, RFC 3646, Dec. 2003, 8 pages.
Nordmark, E., et al., "Basic Transition Mechanisms for IPv6 Hosts and Routers," Network Working Group, RFC 4213, Oct. 2005, 28 pages.
Hinden, R., et al., "IP Version 6 Addressing Architecture," Network Working Group, RFC 4291, Feb. 2006, 26 pages.
Narten, T., et al., "Neighbor Discovery for IP Version 6 (IPv6)," Network Working Group, RFC 4861, Sep. 2007, 98 pages.
Varada, S., Ed., et al., "IP Version 6 over PPP," Network Working Group, RFC 5072, Sep. 2007, 17 pages.
Varada, S., Ed., "Negotiation for IPv6 Datagram Compression Using IPv6 Control Protocol," Network Working Group, RFC 5172, Mar. 2008, 8 pages.
Hill, J., "An Analysis of the RADIUS Authentication Protocol," http://www.untruth.org/~josh/security/radius/radius-auth.html, Copyright © 2001, downloaded from the Internet May 2, 2013, 11 pages.
Winter, S., et al., "TLS Encryption for RADIUS Over TCP (RadSec)," draft-ietf-radext-radsec-01, RADIUS Extensions Working Group, Internet Draft, Aug. 22, 2008, 18 pages.
Winter, S., et al., "TLS Encryption for RADIUS Over TCP (RadSec)," draft-ietf-radext-radsec-05, RADIUS Extensions Working Group, Internet Draft, Jul. 13, 2009, 17 pages.

* cited by examiner

SYSTEM AND METHOD FOR REMOTE AUTHENTICATION DIAL IN USER SERVICE (RADIUS) PREFIX AUTHORIZATION APPLICATION

CROSS-REFERENCE TO RELATED APPLICATIONS

This application claims priority to U.S. Provisional Application No. 61/104,542 filed Oct. 10, 2008 by Behcet Sarikaya et al. and entitled "RADIUS Prefix Authorization Application," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In wireless networks, mobile nodes (MNs) are assigned network addresses, which allow data to be transported and delivered to the customers. For example, the network addresses can be assigned according to the Internet Protocol version 6 (IPv6) network layer protocol. The IPv6 network address may comprise a prefix that is about 64 bits in length and an interface identifier also that is about 64 bits in length. Typically, the interface identifier is created by the MN, while the prefix is assigned by the network, e.g. using a Dynamic Host Configuration Protocol version 6 (DHCPv6) server or an Authentication, Authorization, and Accounting (AAA) server.

Internet Engineering Task Force (IETF) Request for Comments (RFC) 4968 provides different IPv6 link models and provides analysis of various considerations for each link model and the applicability of each link model under different deployment scenarios. For example, the link models can be used for networks based on the Institute of Electrical and Electronics Engineers (IEEE) standard 802.16e for Wireless Broadband. For IPv6 addressing, a shared link model can be used, where an IPv6 prefix is shared by multiple MNs. Alternatively, a point-to-point link model can be used, where each prefix is assigned to a different MN, where different MNs cannot share a prefix but an MN can have multiple prefixes. The addressing and operation of IPv6 over the IPv6 specific part of the packet convergence sub-layer of IEEE 802.16e, where the point-to-point link model is recommended, is specified in RFC 5121. All of the above documents are incorporated herein by reference as if reproduced in their entirety.

SUMMARY

In a first embodiment, the disclosure includes an apparatus comprising a client node configured to communicate with a server node and a plurality of mobile nodes, wherein the client node is configured to obtain Prefix Authorization (PA) for the mobile node from the server node using a Remote Authentication Dial In User Service (RADIUS) protocol.

In a second embodiment, the disclosure includes a network component comprising at least one processor configured to implement a method comprising sending an Access-Request message to an AAA PA server using a RADIUS protocol, receiving an Access-Accept message from the AAA PA server using the RADIUS protocol if the Access-Request message is accepted by the AAA PA server, and receiving an Access-Reject message from the AAA PA server using the RADIUS protocol if the Access-Request message is not accepted by the AAA PA server.

In a third embodiment, the disclosure includes a method comprising using an Access-Request message and an Access-Accept message in a RADIUS PA exchange between an AAA PA server and an Access Router (AR) or a PA client to request, release, and renew at least one prefix for a MN or an interface of a multiple interfaced MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In DHCPv6 PA as defined by IETF RFC 3633, which is incorporated herein by reference, the delegating router may receive the prefixes from an AAA server using a Delegated- IPv6-Prefix RADIUS attribute that was defined for this purpose, e.g. in RFC 4818, which is incorporated herein by reference as if reproduced in its entirety. In such a case, the AAA server passively delegates the prefixes to the delegating router but does not have control over the delegated prefixes in cases such as renumbering.

Disclosed herein, is a system and method for PA based on the RADIUS protocol described in RFC 2865 and IETF document I-D.ietf-radext-design, which are incorporated herein by reference as if reproduced in their entirety. PA is achieved using an AAA server, which may be configured for PA using RADIUS and enabled with complete prefix authorization functionality. By using a RADIUS protocol, a PA client may request at least one prefix from a PA server, release the prefix to the PA server, and renew the prefix when the lifetime of the prefix expires. Additionally, the PA server may renumber the assigned prefix or prefixes. The PA client may be an AR, a Home Agent (HA), or a Local Mobile Anchor (LMA) that acts on behalf of a user or MN.

Figure 1:
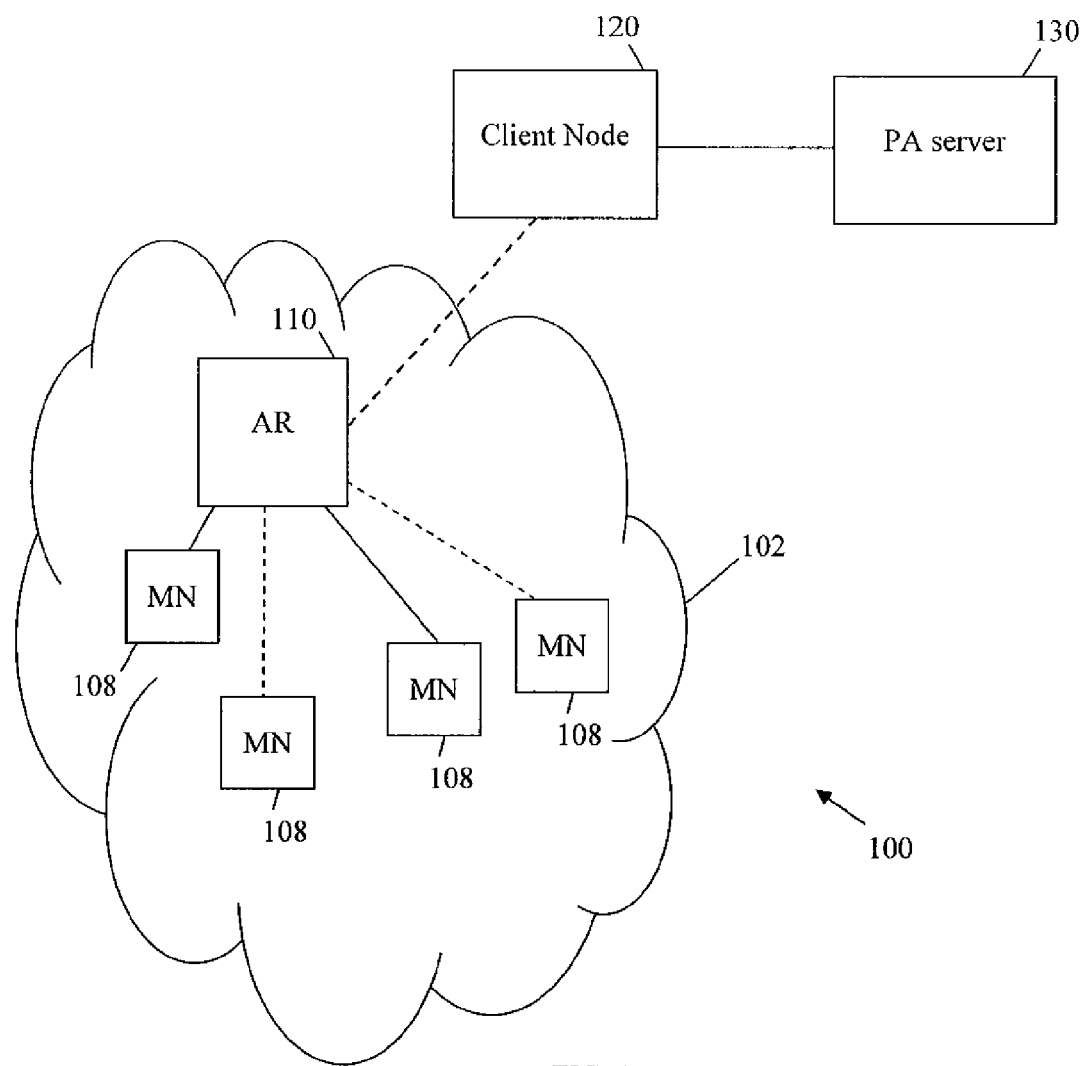
FIG. 1 is a schematic diagram of one embodiment of a wireless access network system.

FIG. 1 illustrates an embodiment of a wireless access network system 100, which may support RADIUS PA and provide improved PA. The wireless access network system 100 may comprise a wireless network 102 that comprises a plurality of MNs 108 and an AR 110. Additionally, the wireless access network system 100 may comprise a client node 120 coupled to the wireless network 102 and a PA server 130 coupled to the AR 110 via the client node 120. The wireless network 102 may establish connections and communicate with one or a plurality of other networks (not shown in FIG. 1), such as server provider networks. For example, the wireless access network 102 may be an IEEE 802.11 Wireless Local Area Network (WLAN), also referred to as WiFi network, which comprises the MNs 108 and AR 110. The wireless network 102 may establish new connections or links with different networks or with the same network at different locations. The wireless network 102 may also connect to different providers. It will be appreciated that FIG. 1 illustrates only one embodiment of the wireless access network system 100. In alternative embodiments, the AR 110 and client node 120 may be combined into a single device. Alternatively, one of the AR 110 or client node 120 could be omitted. Persons of ordinary skill in the art are aware of other embodiments of the wireless access network system 100.

In an embodiment, the MNs 108 may be any mobile devices, components, or networks that use the AR 110 and/or client node 120 to access another network. Specifically, the MNs 108 may be mobile user-oriented devices that communicate with the AR 110 and/or client node 120. For example, the MNs 108 may be cellular telephones, notebook computers, personal digital assistants (PDAs), or any other wireless devices. Additionally or alternatively, the MNs 108 may be fixed communications devices, such as desktop computers or set top boxes, which may be connected to the AR 110 and/or client node 120 via an electrical or optical cable.

In an embodiment, the AR 110 may be any device, component, or network that allows the MNs 108 to communicate with another network. In an embodiment, the AR 110 may be the first Internet Protocol (IP) router that the MNs 108 encounters. For example, the AR 110 may be a wireless router that provides wireless access network coverage to the MNs 108. Additionally, the AR 110 may forward a plurality of IPv6 packets between the MNs 108 and the other network, for instance via the client node 120. The AR 110 may communicate with the MNs 108 via a plurality of fixed links, such as electrical or optical links, via a plurality of wireless links, or both. Additionally, the AR 110 may communicate with the client node 120, with another network, or both via a fixed or wireless link. In FIG. 1, the fixed links are represented by solid lines and the wireless links are represented by dashed lines.

In an embodiment, the client node 120 may be any device, component, or network that provides connectivity or external access to the wireless network 102. For example, the client node 120 may be a HA that is configured for a Mobile Internet Protocol version 6 (MIPv6) and Network Mobility (NEMO) scenario. Alternatively, the client node 120 may be a LMA of Proxy Mobile IPv6, or may be a Packet Data Servicing Node (PDSN) or a Gateway General Packet Radio Service (GPRS) Support Node (GGSN) in a third Generation Partnership Project (3GPP) network. For example, the client node 120 may be an LMA that uses the Proxy Mobile IPv6 protocol to enable mobility support to the MNs 108 without using mobility related signaling, as described in RFC 5213, which is incorporated herein by reference as if reproduced in its entirety. The Proxy Mobile IPv6 protocol may support point-to-point access link to the MNs 108 and may consider only a MN 108 and a Mobile Access Gateway (MAG) (not shown in FIG. 1) on an access link. The LMA may use Proxy Binding Update and Proxy Binding Acknowledgement messages to allocate the prefixes for the MN 108 to the MAG. The client node 120 may also handle IP routing between the MNs 108 via the AR 110 and another network, based on a plurality of assigned IP addresses.

In an embodiment, the PA server 130 may be a server or network that provides all or part of an address using an AAA application. For instance, the PA server 130 may be an AAA server, which may be configured to allocate prefixes (e.g. IPv6 prefixes) or IP addresses, using the AAA protocol. The AAA server may ensure that all the assigned IP addresses are unique, e.g. no IP address is simultaneously assigned to a plurality of MNs 108 or clients. For instance, the AAA server may provide IP address leases that typically comprise the IP prefix or address and an IP address lease time, which may be renewed upon request by the AR 110 via the client node 120. Additionally, the PA server 130 may act as a RADIUS server for authentication using the RADIUS protocol. The PA server 130 may authenticate the wireless network 102, the AR 110, the MNs 108, or combinations thereof before delegating the IP addresses or prefixes.

In an embodiment, the AR 110 may initially establish a home link with the client node 120 to access another network, such as a service provider network. For instance, the AR 110 and the client node 120 may establish a bi-directional tunnel to exchange communications over a wireless link. When an MN 108 connects to the AR 110, the AR 110 or client node 120 may request one or more prefixes for the MN 108. When an MN 108 disconnects from the AR 110, the prefix or prefixes may be released. Further, when an operator needs to renumber the network, different prefixes with different lifetimes may be advertised to the MN 108.

In an embodiment, the AR 110 and/or client node 120 may be PA clients configured to request at least one prefix from the PA server 130 on behalf of any of the MNs 108. The PA client may also request the PA server 130 to release a prefix assigned to the MN 108, or to renew an assigned prefix when the lifetime of the prefix is about to expire. The PA server 130 may be configured to renumber the assigned prefix or prefixes. The PA client may be a RADIUS client that communicates with the PA server 130 using a RADIUS protocol for user authentication to request, release, or renew a prefix. For example, the RADIUS protocol may be used to transport authentication information related to the user, such as a username and a password. Additionally, the PA client may be configured for PA with the PA server 130, as described in detail below. In some alternative embodiments, the wireless access network system 100 may only comprise one of the AR 110 and client node 120, which may handle PA with the PA server 130, IP routing between the MNs 108 and another network, and providing prefixes or addresses assigned by the PA server 130 to the MNs 108.

Figure 2:
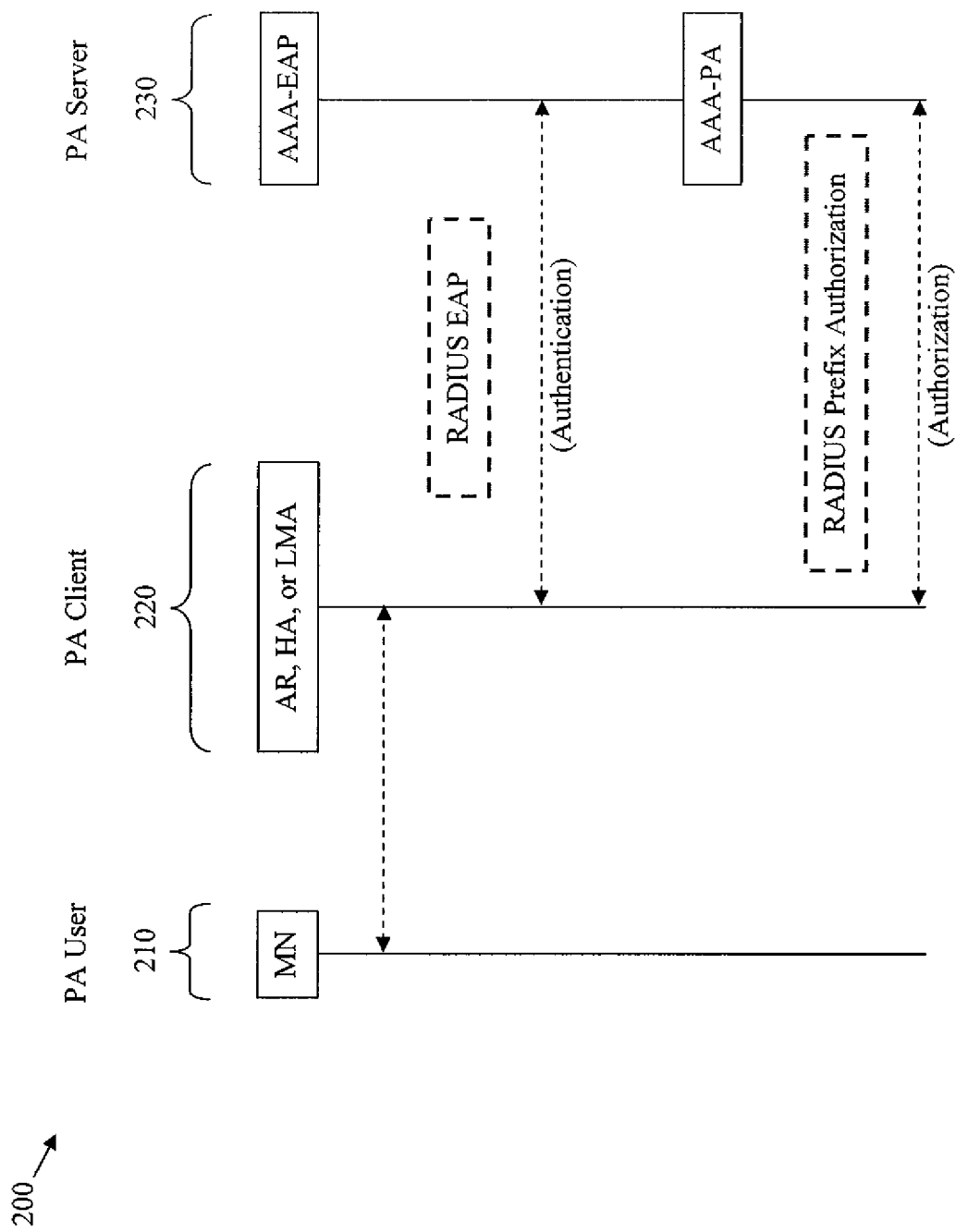
FIG. 2 is a protocol diagram of one embodiment of a RADIUS PA architecture.

FIG. 2 illustrates an embodiment of a RADIUS PA architecture 200, which may be used to delegate at least one prefix, such as an IPv6 prefix, to a user. Specifically, the prefix may be assigned by a PA server using the RADIUS and AAA protocols. The RADIUS PA architecture 200 may comprise a PA user 210, a PA client 220, and a PA server 230. The PA user 210 may be an MN configured similar to the MN 108, the PA client 220 may comprise an AR, HA, and/or LMA and may be configured similar to the AR 110 or client node 120, and the PA server 230 may be an AAA server configured similar to the PA server 130.

In an embodiment, the PA user 210 may first establish a connection, such as a wireless link, with the PA client 220. The PA user 210 may or may not authenticate with the PA client 220 before establishing the connection. The PA client 220 may then authenticate the PA user 210 with the PA server 230 using the RADIUS protocol. For instance, the PA client 220 may use Extensible Authentication Protocol (EAP) exchange with an AAA-EAP entity, such as an application, in the PA server 230. EAP is a framework for authentication used in wireless networks, such as WLANs, and point-to-point connections to provide some common functions and negotiation for a desired authentication mechanism, also referred to as an EAP method. The RADIUS EAP exchange described in RFC 3579, which is incorporated herein by reference as if reproduced in its entirety, may be used to separate AAA authentication from AAA authorization. Specifically, the RADIUS EAP exchange may be used to exchange authentication information related to managing the PA user 210 access to a wireless access network and/or other networks. For instance, the AAA-EAP entity may verify a claimed identity for the PA user 210 by matching a digital identity, such as a network address, to a client information database. In other embodiments, the AAA-EAP may match credentials corresponding to the PA user 210, such as passwords, one-time tokens, digital certificates, or phone numbers to the client information database.

When the PA user 210 is authenticated by the AAA-EAP entity, the PA client 220 may use a RADIUS PA exchange with an AAA-PA entity in the PA server 230 to authorize a prefix or prefixes for the PA user 210. The AAA-PA entity may be a separate entity from the AAA-EAP entity in the PA server 230 and may be configured for service authorization of prefixes for any user upon request. To authorize the prefixes explicitly, the RADIUS PA authorization application may support a plurality of RADIUS messages defined in RFC 2865 and RFC 5176, which are incorporated herein by reference as if reproduced in their entirety. For instance, the AAA-PA entity may determine if a particular right, such as access to some resource, can be granted to the PA user 210 to establish PA before authorizing prefixes to the PA user 210.

Figure 3:
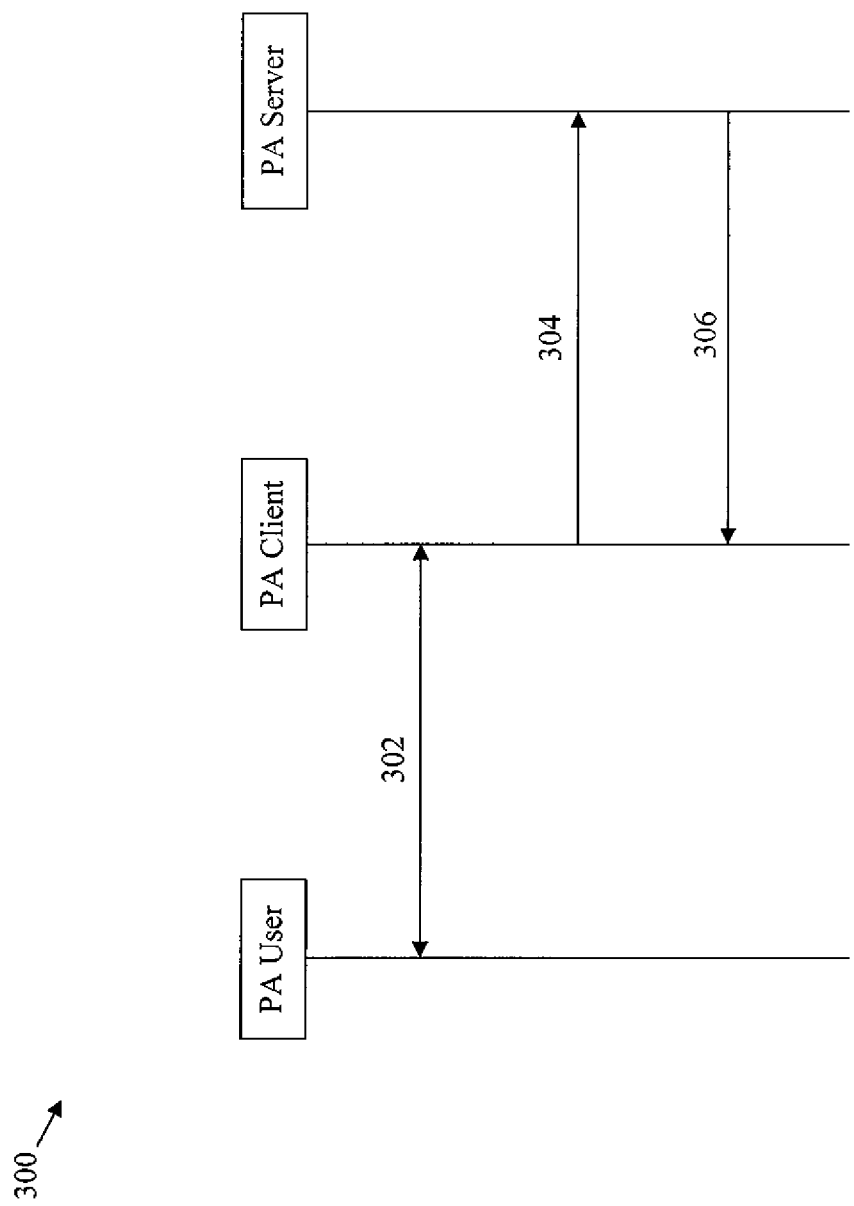
FIG. 3 is a protocol diagram of one embodiment of a prefix request method.

FIG. 3 illustrates one embodiment of a prefix request method 300 for requesting a prefix for a PA user, such as an MN. Specifically, a PA client, such as an AR and/or HA, may request the prefix from a PA server, such as an AAA server, on behalf of the PA user. Initially, the PA user may establish a connection 302 with the PA client. The PA client may then send an Access-Request message 304 to the PA server, e.g. the AAA-PA entity in the PA server, for instance during authorization based on the RADIUS PA architecture 200. The Access-Request message 304 may comprise the identity of the PA user to request a prefix. The PA user may be identified in the message using an Auth-IPv6-Prefix-User-ID attribute described below. The PA client may request an aggregate prefix, and hence distribute (e.g. subnet) the aggregate prefix to a plurality of PA users (e.g. MNs). Alternatively, the PA client may request a single or plurality of dedicated prefixes for a single PA user. Additionally, the Access-Request message 304 may comprise a preferred lifetime value for the prefix, which may be proposed by the PA client in an Auth-IPv6-Prefix-Preferred-Lifetime attribute described below. The Access-Request message 304 may also comprise a Prefix-Lifetime-Service-Type attribute, which may be set to "Request," as described in detail below.

The PA server may receive the Access-Request message 304 and may send an Access-Accept message 306 to the PA client, to allocate one or more prefixes if the prefix request may be satisfied. The Access-Accept message 306 may comprise an IPv6-Prefix attribute that specifies the allocated prefix or prefixes, as described below. The allocated prefix or prefixes may be used during a valid lifetime period, which may be specified in an Auth-IPv6-Prefix-Valid-Lifetime attribute in the Access-Accept message 306, as described below. In an embodiment, the Auth-IPv6-Prefix-Valid-Lifetime attribute may be included in the Access-Request message 304 and set to zero by the PA client. In an embodiment, an Access-Request Grant: Preferred-Lifetime may be added to an Access-Request message 304 by the PA client to propose a message 306, which may comprise an Auth-IPv6-Prefix-Preferred-Lifetime attribute containing the prefix lifetime proposed by the PA client, and a Prefix-Lifetime-Service-Type attribute set to "Request."

Figure 4:
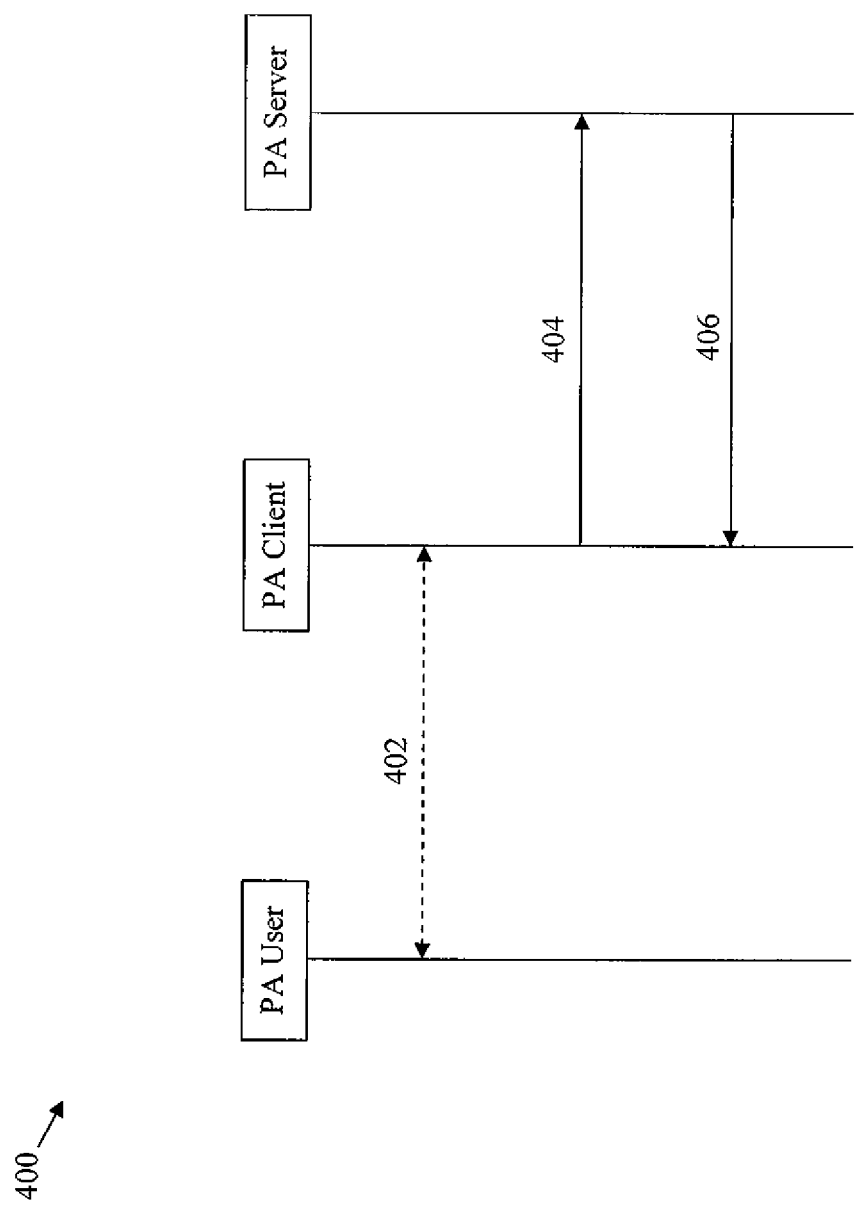
FIG. 4 is a protocol diagram of one embodiment of a prefix release method.

In the case of a prefix request that may not be fulfilled by the PA server, the PA server may send an Access-Reject message instead of the Access-Accept message 306, which may indicate an unsuccessful prefix request. For instance, the Access-Reject message may comprise a Reply-Message attribute that indicates failure of the prefix request. The Access-Reject message may also comprise a reason for rejecting the prefix request FIG. 4 illustrates one embodiment of a prefix release method 400 for releasing a prefix for a PA user, for example which may have been previously assigned using the prefix request method 300. The PA client may release the prefix from a PA server, for instance after establishing a connection 402 with the PA user and before leaving a network. When the PA user detaches from the PA client and an established connection 402 between the two is ended, the prefixes allocated to the PA user may be released. Accordingly, the PA client may send an Access-Request message 404 to the PA server. The Access-Request message 404 may comprise the prefix of the PA user to be released in an Auth-IPv6-Prefix-User attribute. The Access-Request message 404 may comprise a plurality of Auth-IPv6-Prefix-User attributes, each comprising a prefix to be released. The Access-Request message 404 may also comprise a Prefix-Lifetime-Service-Type attribute, which may be set to "Release."

If the prefix request may be satisfied, the PA server may send an Access-Accept message 406 to the PA client to release one or more prefixes. Similar to the Access-Request message 404, the Access-Accept message 406 may comprise one or a plurality of Auth-IPv6-Prefix-User attributes that specify the prefixes to be released and a Prefix-Lifetime-Service-Type attribute that is set to "Release." If the prefix release request may not be satisfied, the PA server may send an Access-Reject message instead of the Access-Accept message 406, which may indicate an unsuccessful prefix release request by the PA client. For instance, the Access-Reject message may comprise a failure message that indicates failure of the prefix release request.

Figure 5:
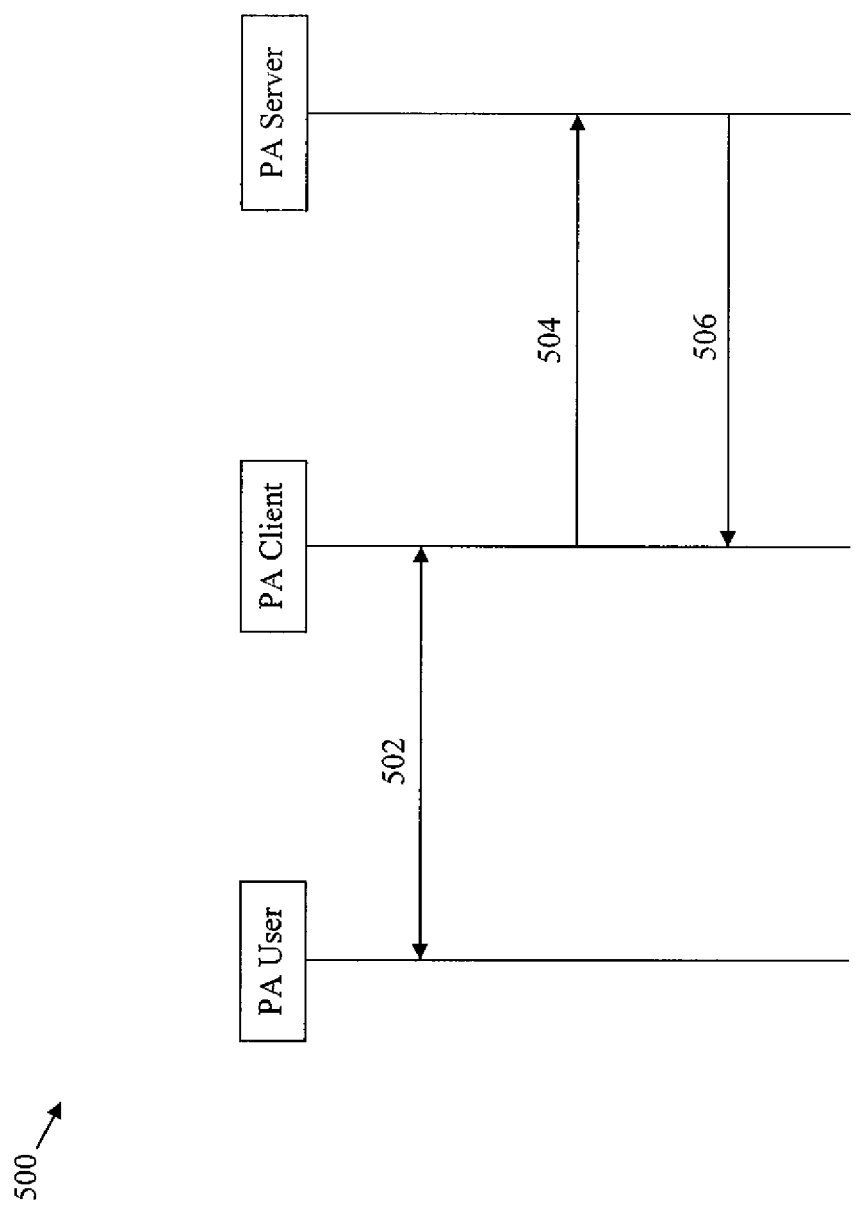
FIG. 5 is a protocol diagram of one embodiment of a prefix renew method.

FIG. 5 illustrates one embodiment of a prefix renew method 500 for renewing a prefix for a PA user, for example which may have been previously assigned using the prefix request method 300. The PA client may request the PA server to renew the prefix for the PA user, for instance after establishing a connection 502 with the PA user and before the prefix lifetime expires. When the prefix lifetime of the PA user is about to expire, the PA client may send an Access-Request message 504 to the PA server to renew the prefix. The Access-Request message 504 may specify the PA user and may indicate the prefix to be renewed using an Auth-IPv6-Prefix-User attribute. The Access-Request message 504 may comprise a plurality of Auth-IPv6-Prefix-User attributes to indicate a plurality of prefixes to be renewed for the PA user. The Access-Request message 504 may also comprise a Prefix-Lifetime-Service-Type attribute, which may be set to "Renew."

If the prefix request may be satisfied, the PA server may send an Access-Accept message 506 to the PA client to renew one or more prefixes. Similar to the Access-Request message 504, the Access-Accept message 506 may comprise one or a plurality of Auth-IPv6-Prefix-User attributes that specify the prefixes to be renewed and a Prefix-Lifetime-Service-Type attribute that is set to "Renew." If the prefix release request may not be fulfilled by the PA server, the PA server may send an Access-Reject message instead of the Access-Accept message 506, which may indicate an unsuccessful prefix renew request by the PA client. For instance, the Access-Reject message may comprise a failure message that indicates failure of the prefix renew request. The Access-Reject message may also comprise a Prefix-Lifetime-Service-Type attribute that may be set to "Renew."

Figure 6:
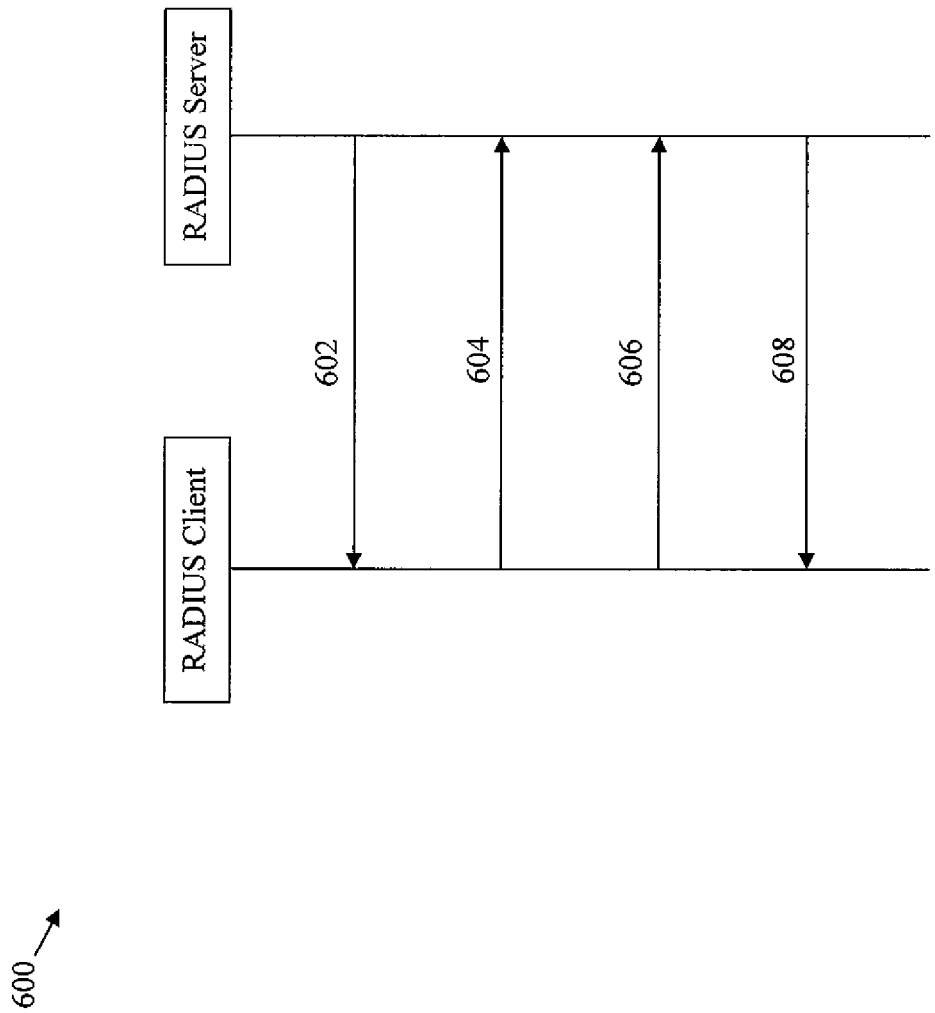
FIG. 6 is a protocol diagram of one embodiment of a prefix renumbering method.

FIG. 6 illustrates one embodiment of a prefix renumbering method 600 for renumbering a prefix that may have been previously assigned for a PA user. Prefix renumbering is one of the features of IPv6 and may be used to acquire new prefixes for user(s) and/or reduce the lifetime of previously delegated prefixes. For instance, prefix renumbering may be initiated when the user relocates to a new network or network provider. To initiate the prefix renumbering method 600, a RADIUS server may send a Change-of-Authorization-Request message 602 to a RADIUS client. The RADIUS server and RADIUS client may be a PA server and PA client, respectively, and may exchange PA information using RADIUS. The Change-of Authorization-Request message 602 may comprise a Prefix-Lifetime-Service-Type attribute, which may be set to "Renumber." The RADIUS client may receive Change-of Authorization-Request message 602 and send in response a Change-of-Authorization-Acknowledgement message 604 to stall prefix renumbering.

Next, the RADIUS client may send an Access-Request message 606 to the RADIUS server to acquire new prefixes. The Access-Request message 606 may be configured similar to the Access-Request message 304 and may comprise a Prefix-Lifetime-Service-Type attribute value set to "Renumber." If the prefix renumber request may be satisfied, the RADIUS server may send to the RADIUS client an Access-Accept message 608, which may be configured similar to the Access-Accept message 306 and comprise new prefixes that may be different than the old previously assigned prefixes. The Access-Accept message 608 may also comprise the old prefixes and their lifetime values that may be reduced. The Access-Accept message 608 may comprise a Prefix-Lifetime-Service-Type attribute value set to "Renumber." Alternatively, if the prefix renumber request may not be satisfied, the RADIUS server may send an Access-Reject message instead of the Access-Accept message 608, which may indicate an unsuccessful prefix renumber request by the RADIUS client. For instance, the Access-Reject message may comprise a failure message that indicates failure of the prefix renumber request. The Access-Reject message may also comprise a Prefix-Lifetime-Service-Type attribute that may be set to "Renumber."

Figure 7:
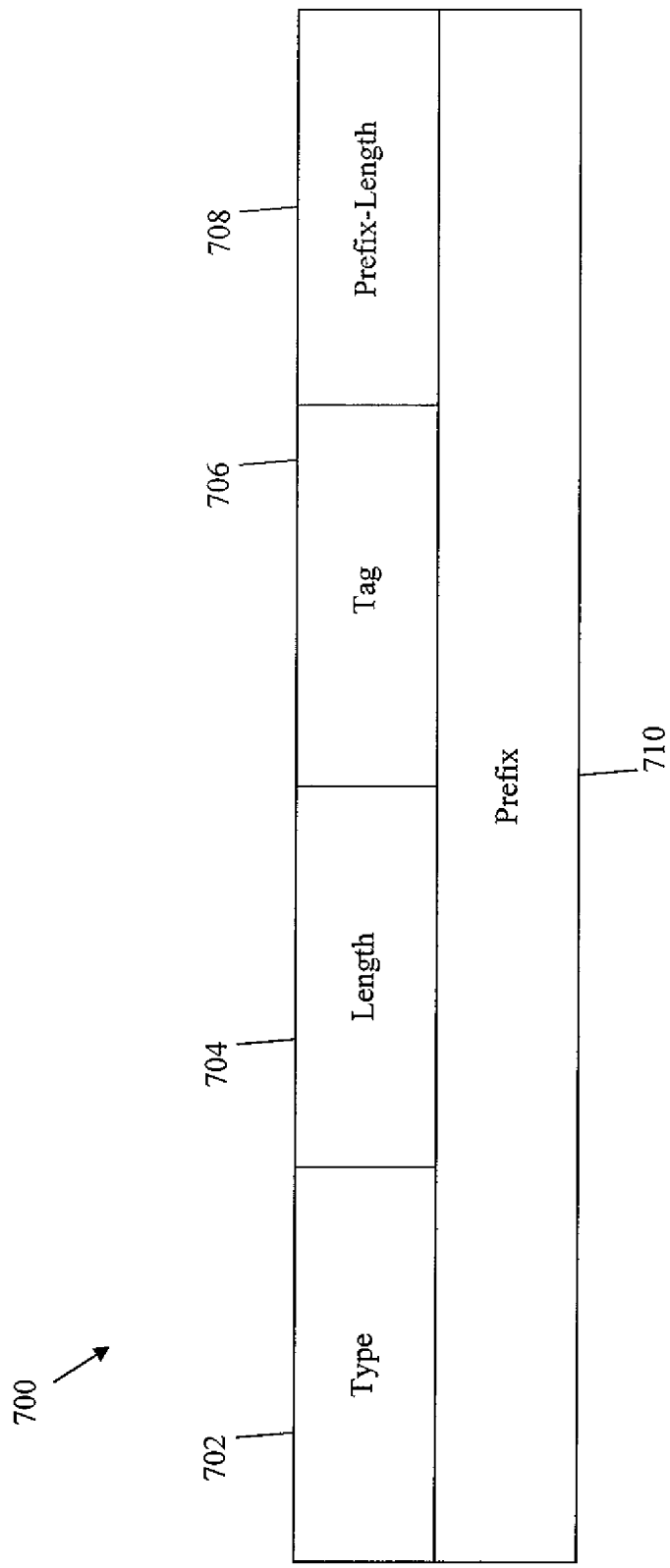
FIG. 7 is an illustration of one embodiment of a prefix attribute.

FIG. 7 is an embodiment of an IPv6-Prefix attribute 700, which may be used in an Access-Accept message (e.g. Access-Accept message 306) and may be configured by a PA or RADIUS server. The IPv6-Prefix attribute 700 may indicate a prefix authorized for a user, e.g. MN, or a Network Access Server (NAS) interface to the user. For instance, the IPv6-Prefix attribute 700 may specify a prefix that may be reachable via the NAS and need to be advertised as a route to the user by the NAS. The Access-Accept message may comprise an IPv6-Prefix attribute 700 for each prefix authorized in the message. The IPv6-Prefix attribute 700 may comprise a Type 702, a Length 704, a Tag 706, a Prefix-Length 708, and a Prefix 710. The Type 702 may be assigned a value, such as an integer value, which indicates that the attribute is an IPv6-Prefix attribute that comprises authorized prefix information. The Length 702 may specify the total length, e.g. in bytes, of the IPv6-Prefix attribute 700. The Tag 706 may be used to associate the IPv6-Prefix attribute 700 and other attributes to the same authorized prefix in the Access-Accept message and other messages. The Prefix-Length 708 may specify the length, e.g. in bytes, of the Prefix 710 in the IPv6-Prefix attribute 700, and the Prefix 710 may comprise the authorized prefix delegated to the user. In an embodiment, each of the Type 702, the Length 704, the Tag 706, and the Prefix-Length 708 may have a size equal to about eight bits, and the Prefix 710 may have a variable length.

Figure 8:
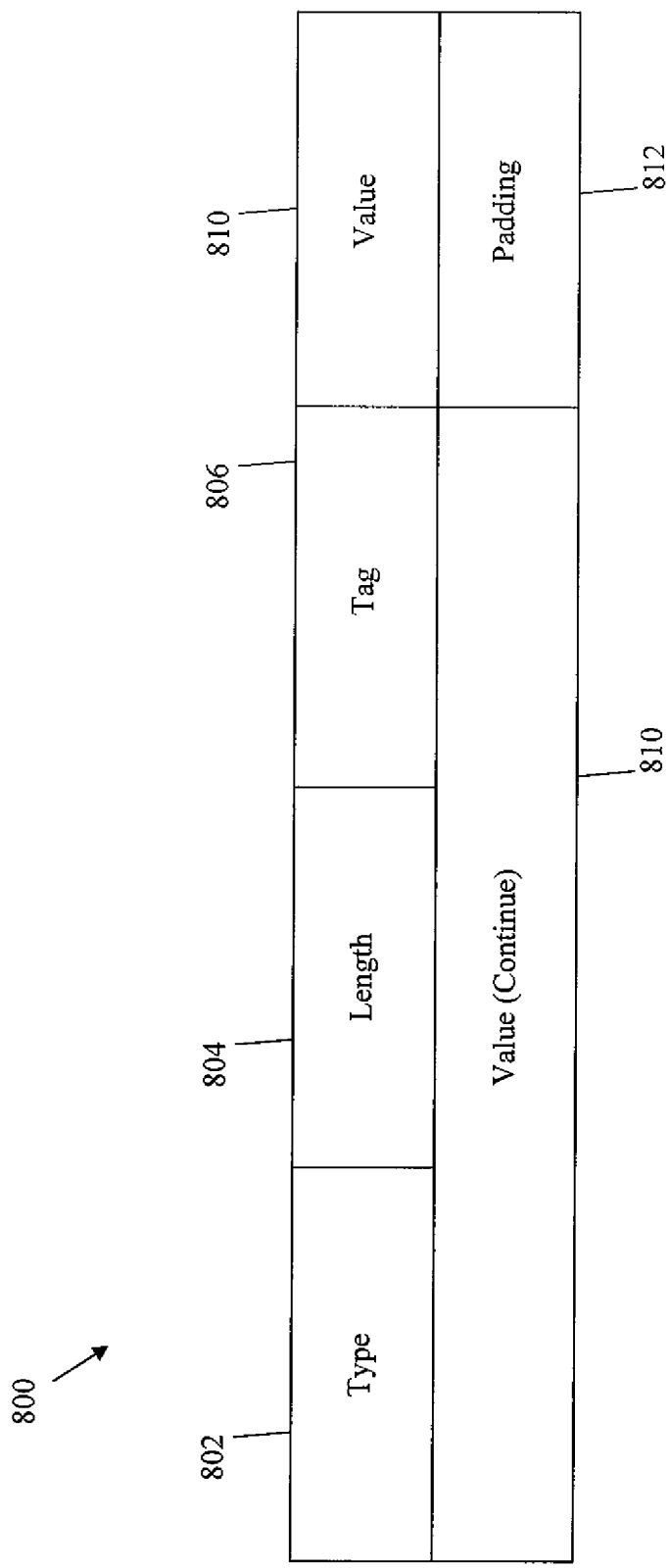
FIG. 8 is an illustration of one embodiment of a prefix lifetime attribute.

FIG. 8 is an embodiment of an Auth-IPv6-Prefix-Valid-Lifetime attribute 800, which may be used in an Access-Accept message and may be configured by a PA or RADIUS server. The Auth-IPv6-Prefix-Valid-Lifetime attribute 800 may indicate a valid lifetime for a prefix authorized for a user. The Access-Accept message may comprise an Auth-IPv6-Prefix-Valid-Lifetime attribute 800 for each prefix authorized in the message. The Auth-IPv6-Prefix-Valid-Lifetime attribute 800 may comprise a Type 802, a Length 804, a Tag 806, a Value 810, and optionally a Padding 812. The Type 802 may be assigned a value, such as an integer value, which indicates that the attribute is an Auth-IPv6-Prefix-Valid-Lifetime attribute that comprises prefix valid lifetime information. The Length 804 may specify the total length, e.g. in bytes, of the Auth-IPv6-Prefix-Valid-Lifetime attribute 800. The Tag 806 may be used to associate the Auth-IPv6-Prefix-Valid-Lifetime attribute 800 and other attributes to the same authorized prefix in the Access-Accept message and in other messages. For instance, the value of the Tag 806 may be greater than about 0x00. The Value 810 may be an unsigned integer that indicates the valid lifetime of the authorized prefix. For instance, the Value 810 may specify the length of time relative to the time the packet is sent, e.g. in seconds, for which the prefix is valid for the purpose of on-link determination. For example, the Value 810 may comprise a value of all one bits, e.g. 0xffffffff, to indicate an infinite prefix lifetime (e.g. the prefix may not expire). The Padding 812 may be used to pad the remaining bits in the Auth-IPv6-Prefix-Valid-Lifetime attribute 800. In an embodiment, each of the Type 802, the Length 804, and the Tag 806 may have a size equal to about eight bits, and the Value 810 may have a size equal to about 32 bits.

Figure 9:
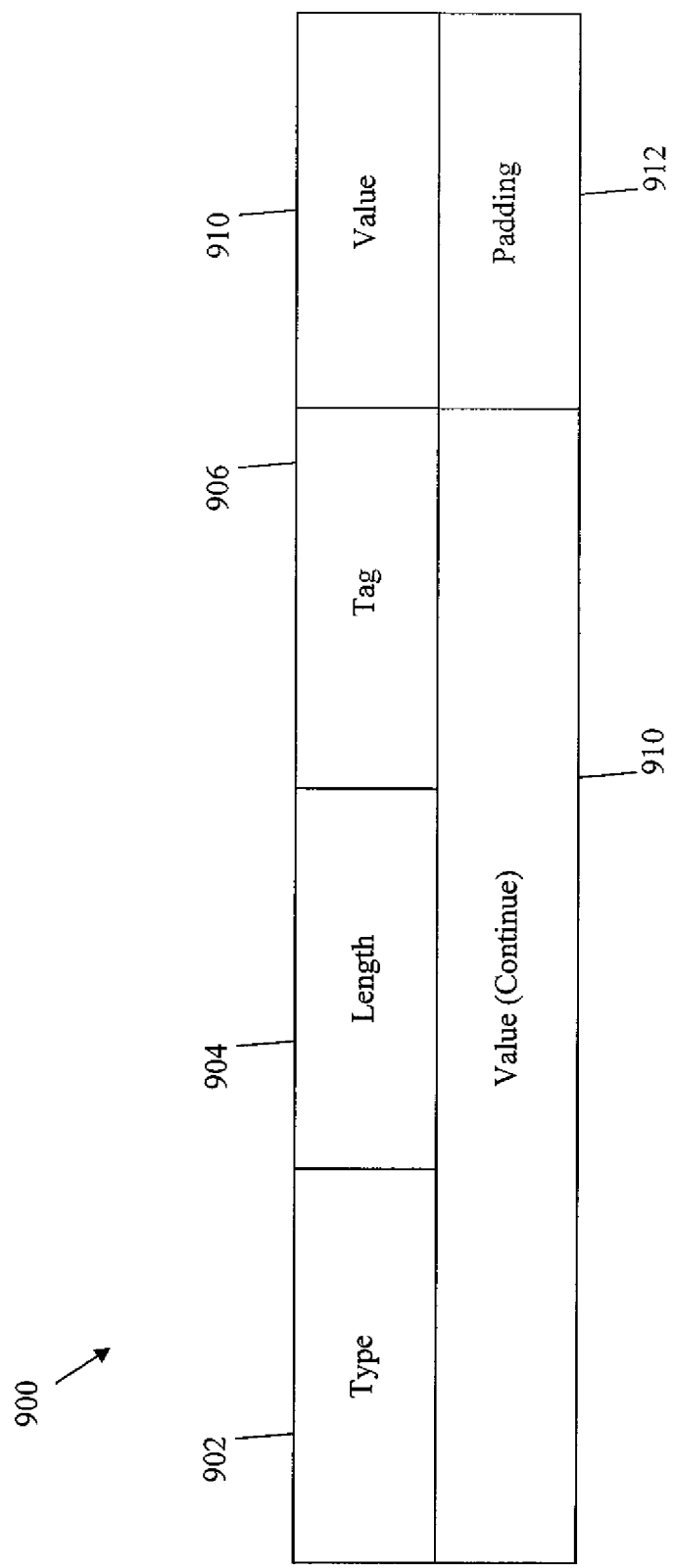
FIG. 9 is an illustration of another embodiment of a prefix lifetime attribute.

FIG. 9 is an embodiment of an Auth-IPv6-Prefix-Preferred-Lifetime attribute 900, which may be used in an Access-Request message (e.g. Access-Request message 304) and may be set by a PA or RADIUS client. The Auth-IPv6-Prefix-Preferred-Lifetime attribute 900 may indicate a preferred lifetime for a prefix by the client, e.g. AR, LMA, mobile router (MR), or HA. The Access-Request message may comprise an Auth-IPv6-Prefix-Preferred-Lifetime attribute 900 for each requested prefix in the message. The Auth-IPv6-Prefix-Preferred-Lifetime attribute may indicate a prefix lifetime that is preferred by the NAS. However, the preferred lifetime may not be necessarily honored by the PA server, and instead the server may assign a different valid lifetime for the authorized prefix, such as in the Auth-IPv6-Prefix-Valid-Lifetime attribute 800. The Auth-IPv6-Prefix-Preferred-Lifetime attribute 900 may comprise a Type 902, a Length 904, a Tag 906, a Value 910, and optionally a Padding 912, which may be configured similar to the corresponding fields in the Auth-IPv6-Prefix-Valid-Lifetime attribute 800. However, the Type 902 may be assigned a value that indicates that the attribute is an Auth-IPv6-Prefix-Preferred-Lifetime attribute that comprises prefix lifetime information preferred or proposed by the client.

Figure 10:
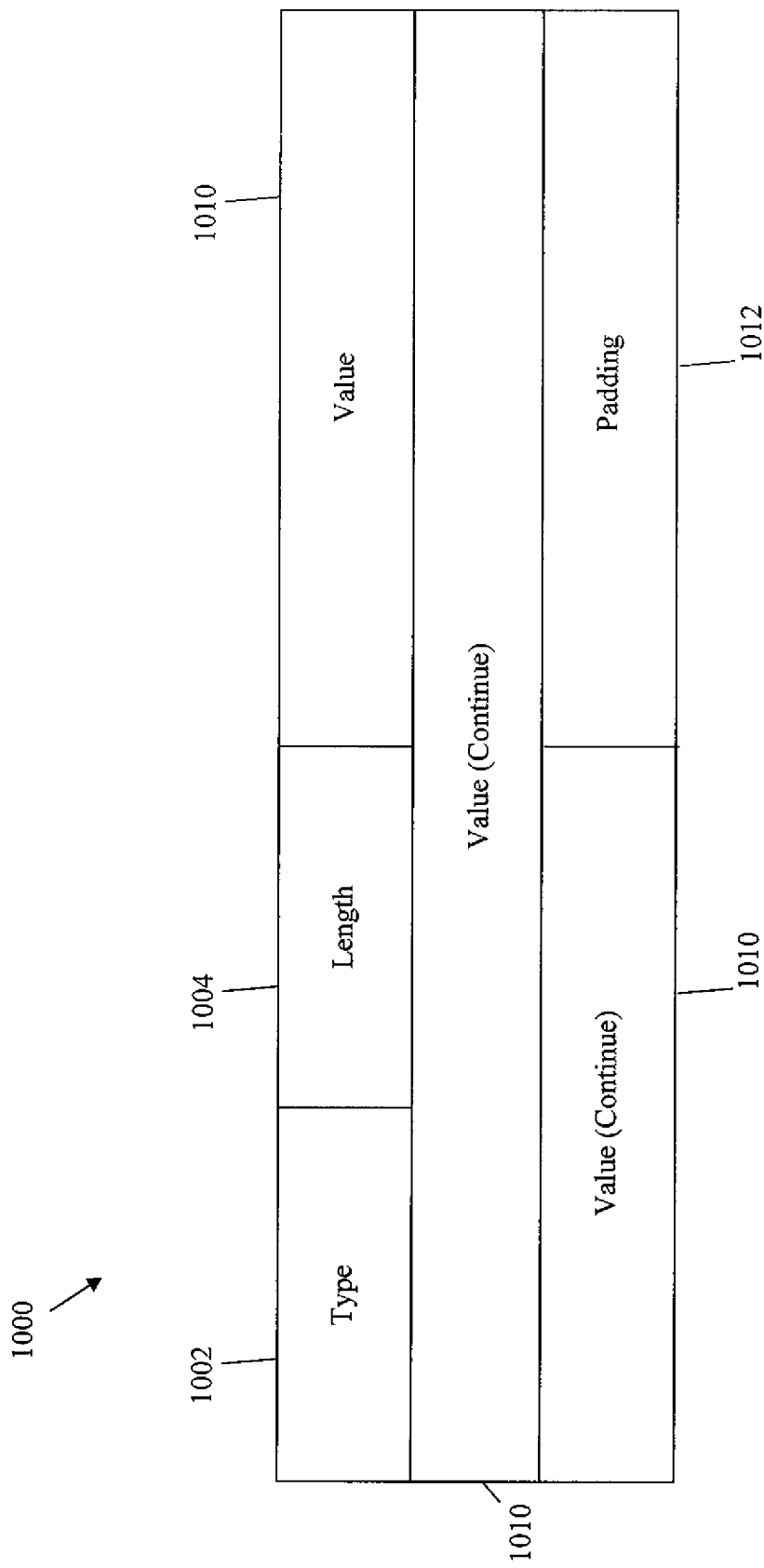
FIG. 10 is an illustration of one embodiment of a prefix user identity (ID) attribute.

FIG. 10 is an embodiment of an Auth-IPv6-Prefix-User-ID attribute 1000, which may be used in an Access-Request message by a PA or RADIUS client and/or in an Access-Accept message by a PA or RADIUS server. The Auth-IPv6-Prefix-User-ID attribute 1000 may identify the PA user of the authorized prefix. The Access-Request message or Access-Accept message may comprise one Auth-IPv6-Prefix-User-ID attribute 1000 for a single user. The Auth-IPv6-Prefix-User-ID attribute 1000 may comprise a Type 1002, a Length 1004, a Value 1010, and optionally a Padding 1012, which may be configured similar to the corresponding fields above. However, the Type 1002 may be assigned a value that indicates that the attribute is an Auth-IPv6-Prefix-User-ID attribute that identifies to the server the user to be delegated a prefix. As such, the Value 1010 may comprise the user ID, which may be an unsigned integer equal to a Media Access Control (MAC) address of the user (e.g. MN) and may have a size equal to about 64 bits.

Figure 11:
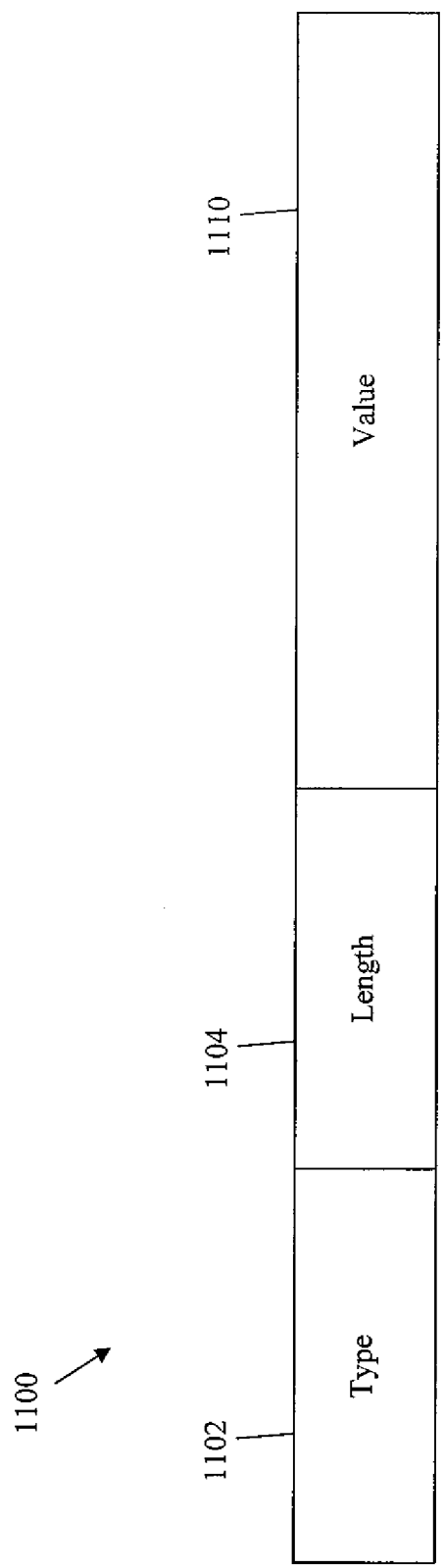
FIG. 11 is an illustration of one embodiment of a prefix service type attribute.

FIG. 11 is an embodiment of a Prefix-Lifetime-Service-Type attribute 1100, which may be used in an Access-Request message by a PA or RADIUS client and/or in an Access-Accept message by a PA or RADIUS server. The Prefix-Lifetime-Service-Type attribute 1100 may indicate the service type for the prefix and how a prefix may be handled. The Access-Request message or Access-Accept message may comprise one Prefix-Lifetime-Service-Type attribute 1100 for a single user. The Prefix-Lifetime-Service-Type attribute 1100 may be associated in the same Access-Request message with the Auth-IPv6-Prefix-Preferred-Lifetime attribute 900 or in the same Access-Accept message with the Auth-IPv6-Prefix-Valid-Lifetime attribute 800. The Prefix-Lifetime-Service-Type attribute 1100 may comprise a Type 1102, a Length 1104, and a Value 1110, which may be configured similar to the corresponding fields above. However, the Type 1102 may be assigned a value that indicates that the attribute is a Prefix-Lifetime-Service-Type attribute that comprises information about the prefix service type.

The Value 1110 may have a size equal to about 64 bits and may be used to specify the service type for the associated prefix. The Value 1110 may comprise a value that indicates one of "Request," "Release," "Renew," or "Renumber." When the Prefix-Lifetime-Service-Type attribute 1100 is in an Access-Accept message, the Value 1110 may be used by the server to indicate to the client how to use the prefix information in the associated attributes or how to handle the prefixes. For example, if the "Request" value is indicated, the client or NAS may obtain the authorized prefix from the Auth-IPv6-Prefix-User-ID attribute 1000 in the Access-Request message. Additionally, the Auth-IPv6-Prefix-Preferred-Lifetime attribute 900 in the Access-Accept message may comprise a non-zero value and the Auth-IPv6-Prefix-Valid-Lifetime attribute 800 may comprise the lifetime value of the assigned prefix. If the "Renew" value is indicated, the Auth-IPv6-Prefix-Valid-Lifetime attribute 800 may comprise the new lifetime value of the prefix, e.g. in seconds. If the "Release" value is indicated, the user may be disconnected or the NAS may be disabled. Accordingly, the Auth-IPv6-Prefix-User-ID attribute 1000 may specify the user interface for which the prefix is to be released.

Figure 12:
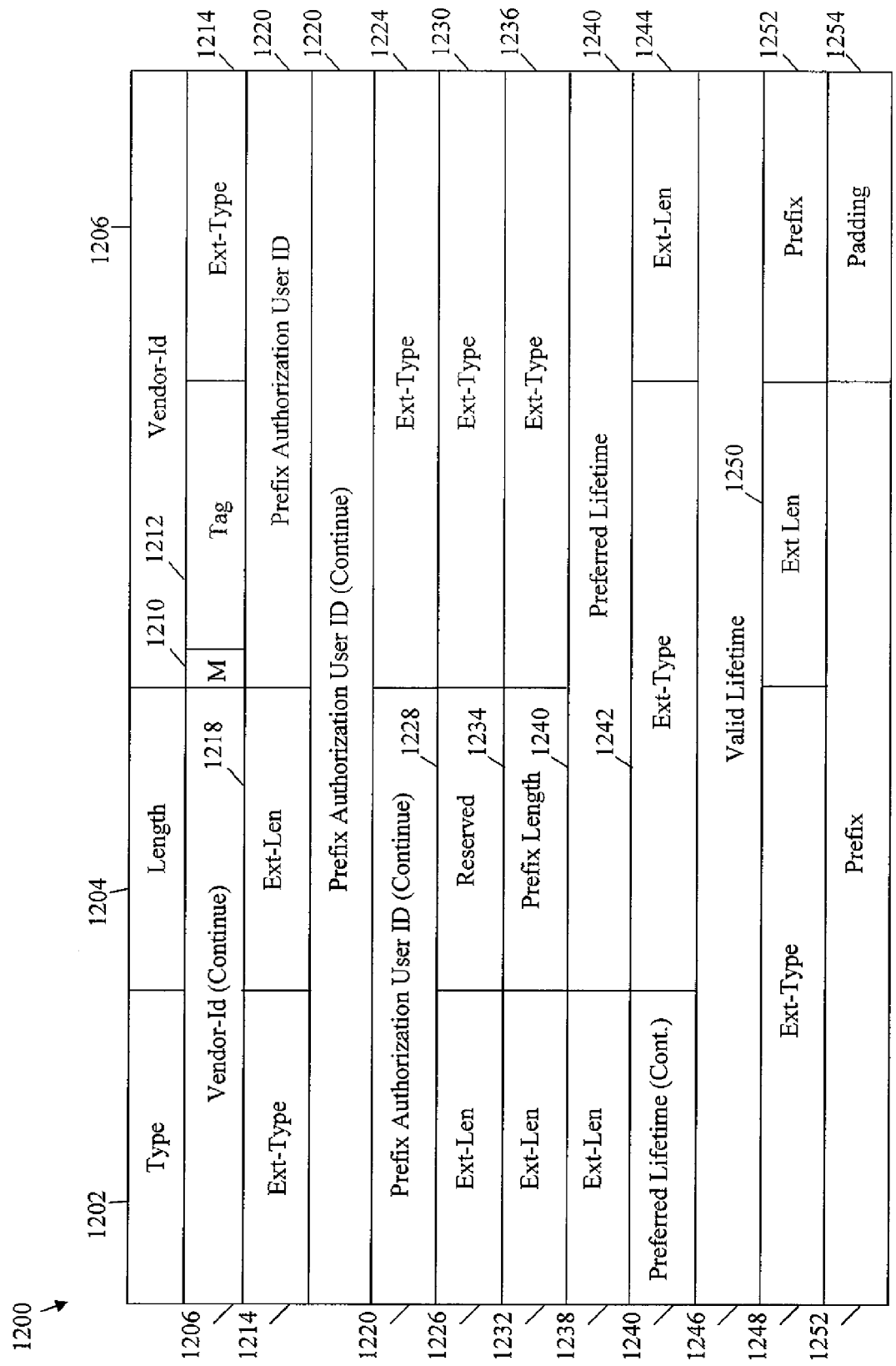
FIG. 12 is an illustration of embodiment of an extended attribute.

FIG. 12 is an embodiment of a first extended attribute 1200, which may be used in an Access-Request message by a PA or RADIUS client and/or in an Access-Accept message by a PA or RADIUS server. The first extended attribute 1200 may comprise PA related information, such as about a user, a user equipment vendor, a user authorized prefix, a preferred prefix lifetime, a valid prefix lifetime, or combinations thereof. The first extended attribute 1200 may comprise a Type 1202, a Length 1204, a Vendor-Identity (Id) 1206, a More (M) bit 1210, and a Tag 1212. The Type 1202, Length 1204, and Tag 1212 may be configured similar to the corresponding fields above. However, the Tag 1212 may have a size equal to about seven bits. The Vendor-Id 1206 may indicate a vendor of the user equipment or any other associated equipment and may have a size equal to about 32 bits. The M bit 1210 may be set to about zero.

Additionally, the first extended attribute 1200 may comprise a plurality of attribute extension fields about at least one PA related information, such a first Ext-Type 1214, a first Ext-Len 1218, and a Prefix Authorized User ID 1220. The first Ext-Type 1214 may indicate that the subsequent attribute extension fields comprise information about a user (or NAS) and may have a size equal to about 16 bits. The first Ext-Len 1218 may specify the length, e.g. in bytes, of the attribute extension fields about the user information and may have a size equal to about eight bits. The Prefix Authorized User ID 1220 may comprise the user (or NAS) ID, which may be equal to the MAC address of the user (e.g. MN) and may have a size equal to about 64 bits.

Additionally or alternatively, the first extended attribute 1200 may comprise a second Ext-Type 1224, a second Ext-Len 1226, and a Reserved field 1228. The second Ext-Type 1224 may indicate that the subsequent attribute extension fields may be reserved and may have a size equal to about 16 bits. The second Ext-Len 1226 may specify the length, e.g. in bytes, of the attribute extension fields to be reserved and may have a size equal to about eight bits. The Reserved field 1228 may be reserved for other uses or may not be used and may have a size equal to about eight bits.

Additionally or alternatively, the first extended attribute 1200 may comprise a third Ext-Type 1230, a third Ext-Len 1232, and a Prefix Length 1234. The third Ext-Type 1230 may indicate that the subsequent attribute extension fields may comprise information about a prefix length and may have a size equal to about 16 bits. The third Ext-Len 1232 may specify the length, e.g. in bytes, of the attribute extension fields about the prefix length and may have a size equal to about eight bits. The Prefix Length 1234 may indicate the size of the authorized prefix and may have a size equal to about eight bits.

Additionally or alternatively, the first extended attribute 1200 may comprise a fourth Ext-Type 1236, a fourth Ext-Len 1238, and a Preferred Lifetime 1240. The fourth Ext-Type 1236 may indicate that the subsequent attribute extension fields may comprise information about the prefix preferred lifetime and may have a size equal to about 16 bits. The fourth Ext-Len 1238 may specify the length, e.g. in bytes, of the attribute extension fields about the prefix preferred lifetime and may have a size equal to about eight bits. The Preferred Lifetime 1240 may indicate the proposed prefix lifetime and may have a size equal to about 32 bits.

Additionally or alternatively, the first extended attribute 1200 may comprise a fifth Ext-Type 1242, a fifth Ext-Len 1244, and a Valid Lifetime 1246. The fifth Ext-Type 1242 may indicate that the subsequent attribute extension fields may comprise information about the prefix valid lifetime and may have a size equal to about 16 bits. The fifth Ext-Len 1244 may specify the length, e.g. in bytes, of the attribute extension fields about the prefix valid lifetime and may have a size equal to about eight bits. The Valid Lifetime 1246 may indicate the authorized prefix lifetime and may have a size equal to about 32 bits.

Additionally or alternatively, the first extended attribute 1200 may comprise a sixth Ext-Type 1248, a sixth Ext-Len 1250, and a Prefix 1252. The sixth Ext-Type 1248 may indicate that the subsequent attribute extension fields may comprise information about the prefix and may have a size equal to about 16 bits. The sixth Ext-Len 1250 may specify the length, e.g. in bytes, of the attribute extension fields about the prefix and may have a size equal to about eight bits. The Prefix 1252 may indicate the authorized prefix and may have a size equal to about 32 bits. The first extended attribute 1200 may also comprise a Padding 1254, which may be used to pad the remaining bits in the first extended attribute 1200.

Figure 13:
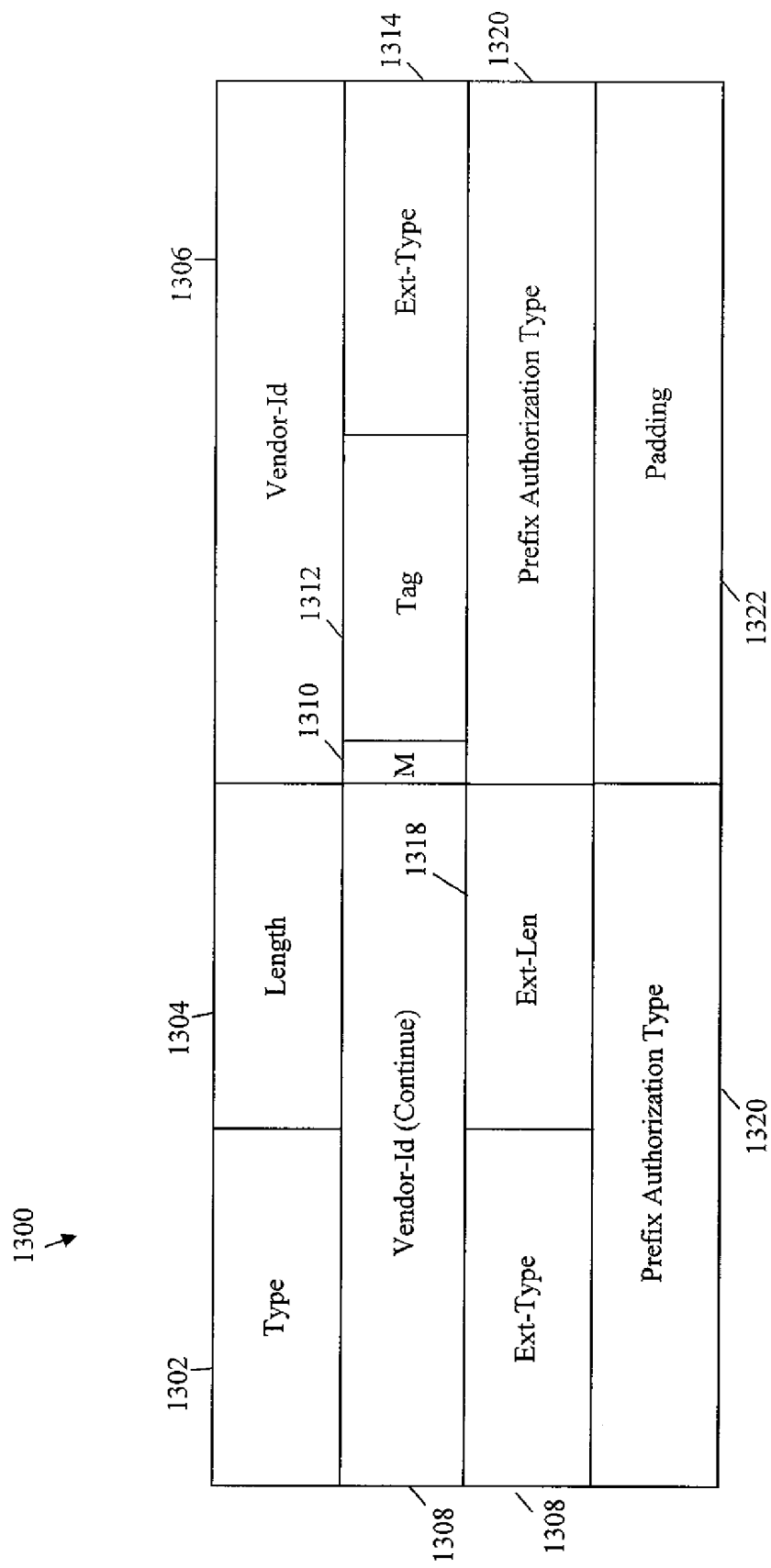
FIG. 13 is an illustration of another embodiment of an extended attribute.

FIG. 13 is an embodiment of a second extended attribute 1300, which may be used in an Access-Request message by a PA or RADIUS client and/or in an Access-Accept message by a PA or RADIUS server. The second extended attribute 1300 may indicate the service type for an authorized prefix and how a prefix may be handled. The second extended attribute 1300 may comprise a Type 1302, a Length 1304, a Vendor-Id 1306, an M bit 1310, and a Tag 1312, which may be configured similar to the corresponding components of the first extended attribute 1200.

Additionally, the second extended attribute 1300 may comprise a plurality of attribute extension fields about a prefix service type, including an Ext-Type 1314, an Ext-Len 1318, a Prefix Authorization Type 1320, and optionally a Padding 1322. The Ext-Type 1314 may indicate that the subsequent attribute extension fields comprise information about the prefix service type and may have a size equal to about 16 bits. The Ext-Len 1318 may specify the length, e.g. in bytes, of the attribute extension fields about the prefix service type and may have a size equal to about eight bits. The Prefix Authorization Type 1320 may have a size equal to about 32 bits and may be configured similar to the Value 1110 to specify the authorization service type for the associated prefix. As such, the Prefix Authorization Type 1320 may comprise a value that indicates one of "Request," "Release," "Renew," or "Renumber" prefix authorization service types. The Padding 1322 may be used to pad the remaining bits in the second extended attribute 1300.

In an embodiment, the Access-Request and/or Access-Accept message may comprise additional attributes, which may be used in the RADIUS protocol for PA. For instance, the message may comprise a Service-Type attribute, which may be used to indicate that the message exchange session is for PA. For example, the Service-Type attribute may be set to "Authorize Only." The message may also comprise a NAS-Port-Type attribute, which may be used by the AAA server, e.g. PA server, to distinguish the source of the Access-Request message. For example, when the Access-Request message originates from a MIPv6 HA or Proxy Mobile IPv6 (PMIPv6) LMA, the NAS-Port-Type attribute may be used and may have a value set to HA6, as described in the IETF document I-D.ietf-mip6-radius, which is incorporated herein by reference as if reproduced in its entirety. Alternatively, when the Access-Request message originates from an AR, such as an Access Service Network Gateway (ASN-GW) for Worldwide Interoperability for Microwave Access (WiMAX) or a serving gateway for 3GPP, the NAS-Port-Type attribute may be used and may have a value set to AR6 that may be specified by the Internet Assigned Numbers Authority (IANA). Additionally, the message may comprise a Message-Authenticator attribute, which may be used to protect all messages used for PA. The Message-Authenticator attribute may be defined in RFC 3579. In the messages used for prefix renumbering, the Message-Authenticator attribute may be calculated as described in RFC 5176.

Figure 14:
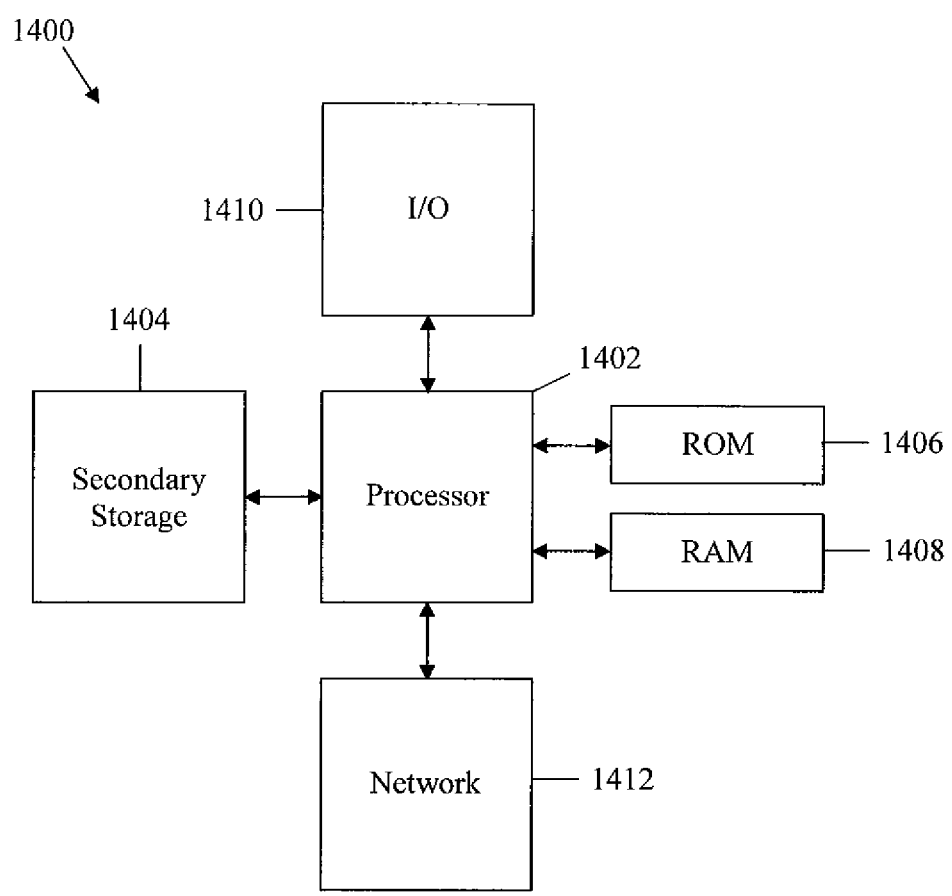
FIG. 14 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or erasable programmable ROM (EPROM) and is used for non-volatile storage of data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A client node comprising:
a memory with stored instructions; and
a processor coupled to the memory and configured to execute the instructions by:
communicating with a server node and a plurality of mobile nodes;
obtaining Prefix Authorization (PA) for one of the mobile nodes from the server node using a Remote Authentication Dial In User Service (RADIUS) protocol; and
requesting that the server node release or renew a prefix for the mobile node by transmitting an Access-Request message to the server node,
wherein the client node communicates with the server node using the RADIUS to authorize a prefix for a Network Access Server (NAS) interface for the mobile node,
wherein the Access-Request message comprises an Auth-IPv6-Prefix-Preferred-Lifetime attribute that indicates a preferred lifetime for a requested prefix for a user of one of the mobile nodes,
wherein the server node comprises an Authentication, Authorization, and Accounting (AAA) Extensible Authentication Protocol (EAP) entity and an AAA PA entity,
wherein the client node communicates with the AAA EAP entity using a RADIUS EAP exchange to authenticate the mobile node, and
wherein the client node communicates with the AAA PA entity using a RADIUS PA exchange to authorize a prefix for the mobile node.

2. The client node of claim 1, wherein the prefix is an Internet Protocol version 6 (IPv6) prefix.

3. The client node of claim 1, wherein the server node is configured to renumber a prefix for the mobile node, and wherein the prefix is an Internet Protocol version 6 (IPv6) prefix.

4. The client node of claim 1, wherein the server node is an AAA server.

5. The client node of claim 4, wherein the HA is part of a Local Mobile Anchor (LMA) that uses Proxy Mobile Internet Protocol version 6 (IPv6) to enable mobility support for the mobile node.

6. A network component comprising:
a memory with stored instructions; and
at least one processor coupled to the memory and configured to execute the instructions by:
sending an Access-Request message to an Authentication, Authorization, and Accounting (AAA) Prefix Authorization (PA) server using a Remote Authentication Dial In User Service (RADIUS) protocol;
receiving an Access-Accept message from the AAA PA server using the RADIUS protocol if the Access-Request message is accepted by the AAA PA server; and
receiving an Access-Reject message from the AAA PA server using the RADIUS protocol if the Access-Request message is not accepted by the AAA PA server,
wherein the Access-Request message comprises an Auth-IPv6-Prefix-Preferred-Lifetime attribute that indicates a preferred lifetime for a requested prefix for a user,
wherein the Auth-IPv6-Prefix-Preferred-Lifetime attribute comprises a Type, a Length, a Tag, and a Value,
wherein the Access-Accept message comprises an IPv6-Prefix attribute that indicates an authorized prefix for a user, and
wherein the IPv6-Prefix attribute comprises a Type, a Length, a Tag, a Prefix-Length, and a Prefix.

7. A network component comprising:
a memory with stored instructions; and
at least one processor coupled to the memory and configured to execute the instructions by:
sending an Access-Request message to an Authentication, Authorization, and Accounting (AAA) Prefix Authorization (PA) server using a Remote Authentication Dial In User Service (RADIUS) protocol;
receiving an Access-Accept message from the AAA PA server using the RADIUS protocol if the Access-Request message is accepted by the AAA PA server; and
receiving an Access-Reject message from the AAA PA server using the RADIUS protocol if the Access-Request message is not accepted by the AAA PA server,
wherein the Access-Request message comprises an Auth-IPv6-Prefix-Preferred-Lifetime attribute that indicates a preferred lifetime for a requested prefix for a user,
wherein the Auth-IPv6-Prefix-Preferred-Lifetime attribute comprises a Type, a Length, a Tag, and a Value,
wherein the Type is assigned a value that indicates that the attribute comprises preferred prefix lifetime information,
wherein the Length specifies the total length of the Auth-IPv6-Prefix-Preferred-Lifetime attribute,
wherein the Tag associates the Auth-IPv6-Prefix-Preferred-Lifetime attribute and any other attributes to the same requested prefix in the Access-Request message and any other messages, and
wherein the Value is an integer that indicates the preferred lifetime of the prefix.

8. The network component of claim 6, wherein the Type is assigned a value that indicates that the attribute comprises authorized prefix information, wherein the Length specifies the total length of the IPv6-Prefix attribute, wherein the Tag associates the IPv6-Prefix attribute and any other attributes to the same authorized prefix in the Access-Accept message and any other messages, wherein the Prefix-Length specifies the length of the authorized prefix, and wherein the Prefix comprises the authorized prefix.

9. The network component of claim 6, wherein the Access-Accept message comprises an Auth-IPv6-Prefix-Valid-Lifetime attribute that indicates a valid lifetime for the authorized prefix, and wherein the Auth-IPv6-Prefix-Valid-Lifetime attribute comprises a Type, a Length, a Tag, and a Value.

10. The network component of claim 9, wherein the Type is assigned a value that indicates that the attribute comprises valid prefix lifetime information, wherein the Length specifies the total length of the Auth-IPv6-Prefix-Valid-Lifetime attribute, wherein the Tag associates the Auth-IPv6-Prefix-Valid-Lifetime attribute and any other attributes to the same authorized prefix in the Access-Accept message and any other messages, and wherein the Value is an integer that indicates the valid or authorized lifetime of the requested prefix.

11. The network component of claim 6, wherein each of the Access-Request message and the Access-Accept message comprises an Auth-IPv6-Prefix-User-ID attribute that identifies a user associated with a prefix, and wherein the Auth-IPv6-Prefix-User-ID attribute comprises a Type, a Length, and a Value.

12. The network component of claim 11, wherein the Type is assigned a value that indicates that the attribute identifies a user to be authorized a prefix, wherein the Length specifies the total length of the Auth-IPv6-Prefix-User-ID attribute, and wherein the Value is an integer equal to a Media Access Control (MAC) address for the user or any other value identifying the user or an interface of a mobile node for the authorized prefix.

13. The network component of claim 6, wherein each of the Access-Request message, the Access-Accept message, and the Access-Reject message comprises a Prefix-Lifetime-Service-Type attribute that indicates the service type for a prefix associated with a user and how to handle the prefix, and wherein the Prefix-Lifetime-Service-Type attribute comprises a Type, a Length, and a Value.

14. The network component of claim 13, wherein the Type is assigned a value that indicates that the attribute comprises information about the prefix service type, wherein the Length specifies the total length of the Prefix-Lifetime-Service-Type attribute, and wherein the Value comprises a value that indicates one of "Request," "Release," "Renew," or "Renumber" that specifies the service type for the prefix.

15. The network component of claim 6, wherein each of the Access-Request message and the Access-Accept message comprises an extended attribute that identifies a user associated with a prefix, a prefix length, a preferred lifetime for a requested prefix for a user, an authorized prefix for a user, and a valid lifetime for the authorized prefix, and wherein the extended attribute comprises a Type, a Length, a Vendor Identity (Id), a Tag, and a plurality of extension types and corresponding extension lengths.

16. The network component of claim 6, wherein each of the Access-Request message and the Access-Accept message comprises an extended attribute that indicates the prefix authorization service type for a prefix associated with a user and how to handle the prefix, and wherein the extended attribute comprises a Type, a Length, a Vendor Identity (Id), a Tag, and an extension type and corresponding extension length.

17. A method comprising:
 using an Access-Request message and an Access-Accept message in a Remote Authentication Dial In User Service (RADIUS) Prefix Authorization (PA) exchange between an Accounting (AAA) Prefix Authorization (PA) server and an Access Router (AR) or a PA client to request, release, or renew at least one prefix for a mobile node (MN) or an interface of a multiple interfaced MN; and
 using a Change-of-Authorization-Request message, a Change-of-Authorization-Acknowledgment message, a second Access-Request message, and a second Access-Accept message to renumber at least one prefix for the MN,
 wherein at least one of the Access-Request messages comprises an Auth-IPv6-Prefix-Preferred-Lifetime attribute that indicates a preferred lifetime for a requested prefix for a user,
 wherein the Auth-IPv6-Prefix-Preferred-Lifetime attribute comprises a Type, a Length, a Tag, and a Value,
 wherein the Type is assigned a value that indicates that the attribute comprises preferred prefix lifetime information,
 wherein the Length specifies the total length of the Auth-IPv6-Prefix-Preferred-Lifetime attribute,
 wherein the Tag associates the Auth-IPv6-Prefix-Preferred-Lifetime attribute and any other attributes to the same requested prefix in the at least one Access-Request message and any other messages, and
 wherein the Value is an integer that indicates the preferred lifetime of the prefix.

\* \* \* \* \*